(12) United States Patent
Oscar et al.

(10) Patent No.: US 11,597,626 B2
(45) Date of Patent: Mar. 7, 2023

(54) CABLE RECOVERY MACHINE

(71) Applicant: TESMEC S.P.A., Milan (IT)

(72) Inventors: Alberto Oscar, Castro (IT); Fabrizio Parodi, Presezzo (IT)

(73) Assignee: TESMEC S.P.A., Milan (IT)

(*) Notice: Subject to any disclaimer, the term of this patent is extended or adjusted under 35 U.S.C. 154(b) by 0 days.

(21) Appl. No.: 16/420,798

(22) Filed: May 23, 2019

(65) Prior Publication Data

US 2020/0255256 A1    Aug. 13, 2020

(30) Foreign Application Priority Data

Feb. 8, 2019 (IT) .................. 102019000001845

(51) Int. Cl.
| | | |
|---|---|---|
| *B65H 75/44* | (2006.01) | |
| *B65H 51/06* | (2006.01) | |
| *B65H 75/42* | (2006.01) | |

(52) U.S. Cl.
CPC .......... *B65H 75/4442* (2013.01); *B65H 51/06* (2013.01); *B65H 75/425* (2013.01); *B65H 75/4402* (2013.01); *B65H 75/4457* (2013.01); *B65H 2301/4189* (2013.01); *B65H 2701/34* (2013.01)

(58) Field of Classification Search
CPC ............................ B65H 51/10; B65H 75/4402; B65H 75/4457; B65H 75/4442; B65H 51/06; B65H 75/425; B65H 2301/4189; B65H 2701/34; H02G 1/005; H02G 1/04; H02G 1/1265; Y02W 30/82
USPC ............................ 83/276, 287, 288, 327, 950
See application file for complete search history.

(56) References Cited

U.S. PATENT DOCUMENTS

| | | | | |
|---|---|---|---|---|
| 1,221,594 A | * | 4/1917 | Richman | B26D 1/626 83/303 |
| 1,224,046 A | * | 4/1917 | Turley | B65H 51/10 29/283 |
| 2,247,004 A | | 6/1941 | Sullivan | |
| 3,121,361 A | * | 2/1964 | Kramer | B23D 25/08 83/315 |
| 3,144,949 A | | 8/1964 | Haugwitz | |
| 3,207,020 A | * | 9/1965 | Passoni | B23D 45/22 83/327 |
| 3,310,210 A | | 3/1967 | Reib | |
| 3,396,890 A | | 8/1968 | Fulton | |
| 3,442,168 A | * | 5/1969 | Gatto | B26D 3/16 83/354 |

(Continued)

OTHER PUBLICATIONS

Office Action for U.S. Appl. No. 16/420,987, dated Jul. 2, 2020, 10 Pages.

*Primary Examiner* — Ghassem Alie

(74) *Attorney, Agent, or Firm* — Maine Cernota & Rardin

(57) ABSTRACT

A cable recovery machine, having at least one traction module configured to hold and draw at least one cable, in particular of a cable laying plant, and at least one cutting module located downstream of the traction module and able to receive the cable that is introduced into the cutting module in a direction of feed (X1); the cutting module having at least one cutting unit provided with at least one cutting blade and integral with a shaft made to rotate by corresponding drive means, so that by rotating the shaft, the cutting unit is made to rotate and cuts the cable when the latter enters the cutting module in the direction of feed (X1).

9 Claims, 3 Drawing Sheets

(56) References Cited

U.S. PATENT DOCUMENTS

| | | | |
|---|---|---|---|
| 3,521,513 A * | 7/1970 | Gomann et al. | A24C 5/326 83/310 |
| 3,620,432 A | 11/1971 | Emery | |
| 3,728,923 A * | 4/1973 | Lanore | A24C 5/28 83/318 |
| 3,854,614 A | 12/1974 | Albrecht | |
| 4,022,092 A * | 5/1977 | Scheib et al. | B23D 45/22 83/306 |
| 4,048,831 A | 9/1977 | Fabian | |
| 4,244,250 A * | 1/1981 | Rudszinat | A24C 5/28 198/792 |
| 4,264,026 A | 4/1981 | Pomeret | |
| 4,411,194 A | 10/1983 | Davidson, Jr. | |
| 5,097,576 A * | 3/1992 | Kadono et al. | B23D 21/04 29/33 T |
| 5,139,600 A | 8/1992 | Singer | |
| 5,139,751 A * | 8/1992 | Mansfield | E03F 9/00 137/355.2 |
| 5,497,928 A | 3/1996 | Burns | |
| 5,839,636 A | 11/1998 | Fleishmann | |
| 5,967,512 A | 10/1999 | Irsik | |
| 6,174,399 B1 | 1/2001 | DeCandia | |
| 6,176,410 B1 | 1/2001 | Ueda | |
| 6,189,758 B1 | 2/2001 | Cherix | |
| 6,253,651 B1 * | 7/2001 | Bessemer | B26D 1/29 83/171 |
| 7,134,374 B1 * | 11/2006 | Williamson et al. | E21B 29/04 83/597 |
| 7,810,687 B2 | 10/2010 | DeFigueiredo | |
| 10,294,064 B2 | 5/2019 | Corley | |
| 2002/0108983 A1 | 8/2002 | Cote | |
| 2010/0181360 A1 | 7/2010 | Perdue | |
| 2011/0049211 A1 | 3/2011 | Schutz | |
| 2015/0008245 A1 | 1/2015 | Wortmann | |
| 2016/0355369 A1 | 12/2016 | Kang | |
| 2017/0136507 A1 * | 5/2017 | Blevins | B65H 51/10 |

* cited by examiner

CABLE RECOVERY MACHINE

RELATED APPLICATIONS

This application claims priority to Italy Patent Application No. 102019000001845, filed Feb. 8, 2019. This application is herein incorporated by reference in its entirety for all purposes.

FIELD OF THE INVENTION

The present invention concerns a machine to recover a cable, such as for example an electrical conductor, a wire, an optical fiber, or suchlike, in particular for the continuous recovery of a cable of a cable laying plant and for its disposal, for activities to replace the existing cable in the laying plant.

The present recovery machine can be used in particular in a laying plant, for example, of a high voltage overhead electric line and in general in overhead lines which provide the commonly known "braked" laying of cables, that is of overhead conductors.

BACKGROUND OF THE INVENTION

In laying plants of overhead lines, the current method to replace overhead conductors, that is, so-called "reconductoring", provides the following operations:
  connecting the new conductor or a drawing wire to the existing conductor;
  positioning the pulleys to lay the conductor on the supports that form the segment of the line on which the conductor is being replaced;
  recovering the old conductor with a winch-brake, then storing the old conductor on empty reels previously prepared at the winch station;
  simultaneously releasing the new conductor from the reel on which it is wound with the use of a brake (or a winch-brake) at the brake station, to allow the "braked" laying of the new conductor;
  subsequently collecting and transporting the reels of old conductor to a recycling and disposal center, where it is broken down and divided according to the materials it is made of.

The high voltage overhead transmission lines can consist of single conductors (one per phase), but more typically they consist of multiple conductors for each phase, ranging from 2 to 6, but also with a tendency to increase up to 8 or 10 conductors.

The brake and winch stations are located at opposite ends of a section of the line on which the conductor is being replaced.

The winch station where the old conductor is recovered can consist of a winch-brake machine to recover the old conductor and of a number of reel-holding trestles at least equal to the number of conductors that make up each single phase of the line, or more generally to multiples of this number. The empty reels will then be installed on the trestles, and will collect the "old" conductor, which will then be disposed of in special recycling centers.

The brake station where the new conductor, or a drawing wire to be subsequently used to tension the new conductors, is unwound and tensioned, normally consists of a brake or winch-brake machine and a number of reel-holding trestles at least equal to the number of conductors that make up each single phase of the line, or more generally to multiples of this number.

The size of the winch and brake stations is proportional to this plurality of trestles on which the individual reels must be housed.

The winch-brakes to recover the existing conductor normally consist of a pair of winches for each conductor, the diameter of which is provided as 35 times the diameter of the conductor to be recovered.

Normally, the conductors that form the high voltage lines have multiple interruptions along their length, essentially due to the presence of so called mid span joints. Their function is to connect the two ends of the conductors during a reel change, that is, when a reel of new conductor ends, and the next reel begins.

Generally, the joints consist of straight aluminum and/or steel tubular cores with a variable length from 500 mm to 2000 mm.

The joints cannot pass over the winches, as they would break due to the bending caused by the winding on the circular surface, with the consequent catastrophic fall of the tensioned line.

For this reason, current reconductoring operations are subject to countless interruptions in the process; in essence, when a joint reaches the winch machine, the following steps must be followed:
  stop the winch machine when the joint is close to the winches;
  clamp the end of the conductor upstream of the joint with vices suitable to maintain the draw on the line;
  release the draw of the other end of the conductor on the winch side;
  cut and remove the joint in question;
  replace the cut joint with a flexible joint, for example a braid-type joint;
  resume the draw of the line with the winch machine;
  remove the vice that held the end upstream of the line;
  resume the reconductoring operations, until the braid-type joint exits the winch machine and appears on the reels that recover the old conductor;
  stop the winch machine again;
  clamp the end of the conductor on the winch side with vices suitable to maintain the draw on the line;
  release the draw of the other end of the conductor on the reel side;
  remove the braid-type joint and clamp the end of the conductor on the recovery reel;
  resume the draw of the line with the winch machine;
  remove the vice that held the end upstream of the line;
  resume reconductoring operations.

This sequence of operations must be repeated whenever a new joint arrives in front of the winch machine.

Furthermore, the process is interrupted whenever the new conductor present at the brake station runs out, and therefore the empty reel needs to be replaced with a full one, or when the old conductor reel at the winch station is full, and therefore the full reel needs to be replaced with an empty one.

At the end of the operations, the old conductor present on the reels filled at the winch station must also be disposed of.

Recovery machines exist that allow to recover the conductor and dispose of it in order to replace the existing conductor.

These machines generally comprise at least one cable traction module and at least one cable cutting module, so that the replaced cable can be cut into several parts and suitably stored, instead of being re-wound onto a reel.

The cutting module can be formed for example by a system of translating cutters which is located downstream of the traction module and which often proves to be rather complex, cumbersome and inefficient for the cutting of any section or part of the cable, also understood as a section of the cable in which there is a joint connecting segments of a conductor, which needs to be cut.

It is therefore possible to improve on known recovery machines with regard to the efficiency, operating flexibility and speed with which the recovered cable has to be continuously cut, for the purpose for example of its subsequent disposal.

There is therefore the need to perfect a cable recovery machine that can overcome at least one of the disadvantages of the state of the art.

One purpose of the present invention is therefore to provide a cable recovery machine that is able to recover a cable, in particular of a cable laying plant, in an efficient and rapid manner and transfer it toward a cutting module in which the cable can be cut continuously and without interruptions.

Another purpose of the present invention is to provide a cable recovery machine that is able to cut a cable effectively and without interruptions whatever the composition of the cable, for example metal materials, and whatever the diameter of the cable to be recovered, and that is therefore able for example to effectively and continuously cut segments of conductor, connection joints, or other.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, one object of the invention is a cable recovery machine, comprising at least one traction module configured to hold and draw at least one cable, in particular of a cable laying plant, and at least one cutting module located downstream of the traction module and able to receive the cable that is introduced into the cutting module in a direction of feed.

According to one aspect of the invention, the cutting module comprises at least one cutting unit provided with at least one cutting blade and integral with a shaft made to rotate by means of corresponding drive means, so that by rotating the shaft, the cutting unit is made to rotate and cuts the cable when the latter enters the cutting module in the direction of feed.

Advantageously, thanks to the use of a cutting unit which is made to rotate and is provided with at least one cutting blade, it is possible, in an efficient and rapid manner, to cut a cable recovered by the present machine continuously and without interruptions. The present cable recovery machine is also able to cut a cable effectively and without interruptions whatever the composition of the cable and whatever the diameter of the cable to be recovered, therefore it is able, for example, to effectively and continuously cut segments of conductor, connection joints, or other.

According to a further aspect of the invention, the cutting unit can be positioned substantially along an axis almost transverse to the direction of feed of the cable inside the cutting module.

In some embodiments, the axis along which the cutting unit is positioned can be substantially parallel to the axis of rotation of the shaft integral with the cutting unit.

In further embodiments, the axis along which the cutting unit is positioned can be substantially transverse to the axis of rotation of the shaft integral with the cutting unit.

The cutting module can comprise one or more support disks for the at least one cutting blade integral with the rotation shaft of the cutting unit.

The machine can comprise discharge means located downstream of the cutting module and able to allow to discharge the segments of cable cut by the machine.

The cutting module can also comprise a support structure provided with at least one aperture able to allow the direct passage of the cut segments of cable toward the discharge means.

The discharge means can comprise at least a first conveyor belt located under the aperture and at least a second conveyor belt located downstream of the first conveyor belt.

In some embodiments, the machine can comprise a system to align the cable located downstream of the traction module.

The alignment system can comprise a plurality of rollers disposed in sequence and on which the cable is made to pass in the direction of feed. At least one of the rollers of the alignment system can be motorized.

These and other aspects, characteristics and advantages of the present disclosure will be better understood with reference to the following description, drawings and attached claims. The drawings, which are integrated and form part of the present description, show some embodiments of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
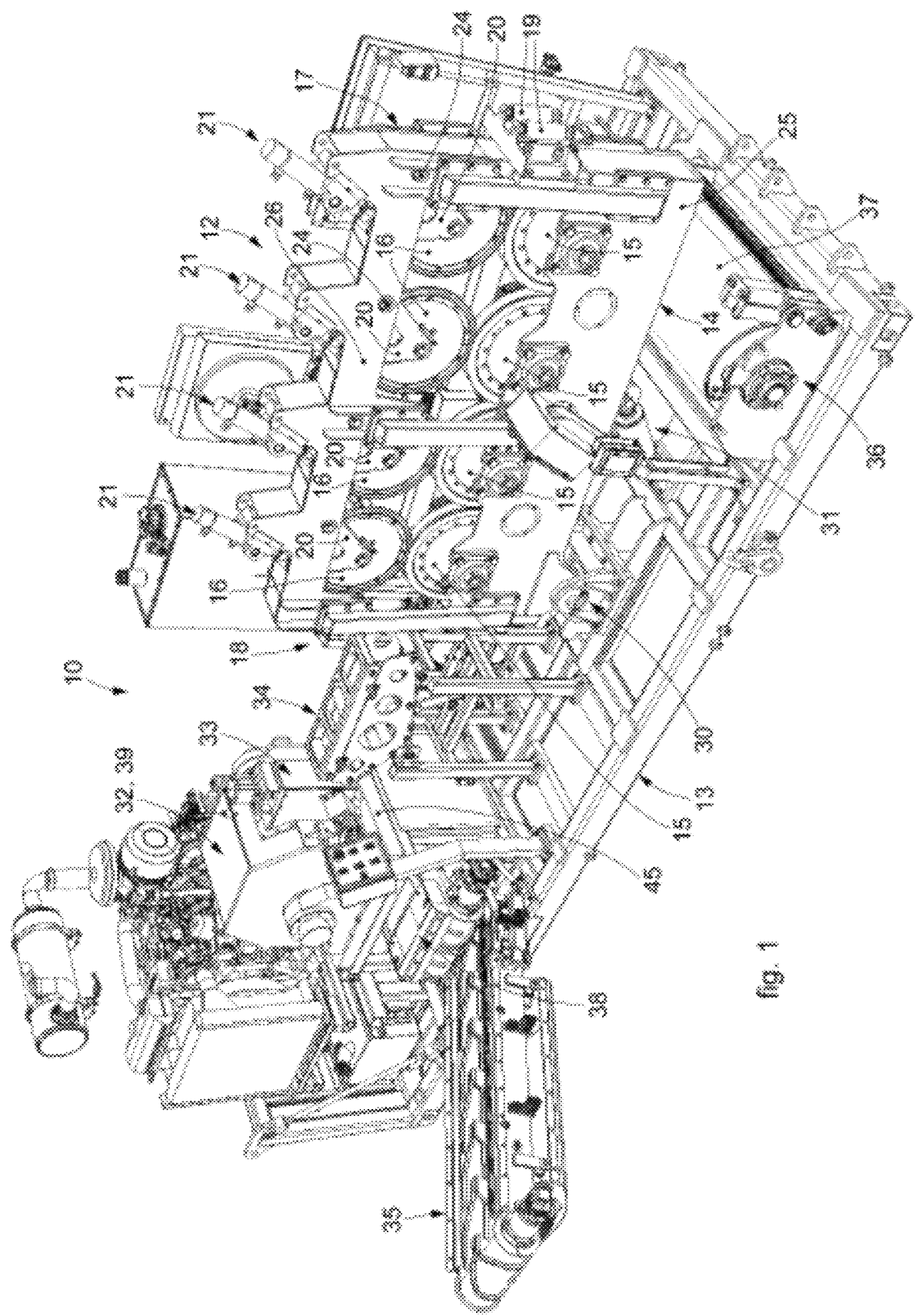
FIG. 1 is a three-dimensional view of a cable recovery machine according to the present invention.

With reference to the attached drawings and in particular to FIG. 1 thereof, a machine 10 to recover a cable 11, in particular of a cable laying plant, comprises at least a traction module 12.

The traction module 12 is positioned above a support structure 13 of the machine 10, by means of which the machine 10 can be transported on a truck and can work both on the truck and directly on the ground.

In some embodiments, the traction module 12 can comprise a frame 14 on which one or more traction wheels 15 and one or more idle wheels 16 are positioned.

A space for the passage and traction of the cable 11 to be recovered is made between the traction wheels 15 and the idle wheels 16, by reciprocal distancing of the traction wheels 15 from the idle wheels 16, which is substantially determined by the entry of the cable 11 to be drawn into the traction module 12. The traction module 12 provides a side 17 for the entry and a side 18 for the exit of the cable 11 to be drawn. Rollers 19 to guide and align the cable 11 can be provided in correspondence with the entry side 17.

The idle wheels 16 are provided with a support 20 connected mobile, in particular rotatable, to the frame 14 of the traction module 12 and are provided with actuators 21 configured to press the idle wheels 16 against the cable 11 which passes between them and the first pair of traction wheels 15, so that the space between the idle wheels 16 and the traction wheels 15 can be adjusted automatically according to the diameter or thickness of the cable 11 drawn.

The idle wheels 16 could also provide a support 20 mobile sliding or translatable with respect to the frame 14 with the aid of the actuators 21.

Substantially, the purpose of the traction wheels 15 is to transmit the speed and the torque required for traction to the cable 11, while the purpose of the idle wheels 16 is to press the cable 11 against the traction wheels 15 with the correct pressure, so as to generate the correct friction on the cable 11 for traction operations.

The recovery speed of the cable 11 will therefore be determined by the speed of rotation of the traction wheels 15.

The traction wheels 15 can be made of different materials, for example steel, aluminum or suchlike and possibly be coated with rubber or other polymeric material, according to the friction that is to be generated on the cable 11.

Each idle wheel 16 is provided with its own actuator 21 and its own support 20 connected to the frame 14 of the traction module 12 by means of a rotation pin 24, so that the idle wheels 16 are mobile independently of each other.

As can be observed, the traction wheels 15 are aligned on a lower part 25 of the traction module 12, while the idle wheels 16 are aligned on an upper part 26 of the traction module 12. The lower part 25 is the part of the traction module 12 facing the support structure 13 of the machine 10.

In the embodiment shown by way of example, the traction module 12 comprises two pairs of traction wheels 15 and two pairs of idle wheels 16, substantially so that at least two idle wheels 16 and two traction wheels 15 are always engaged with the cable 11, even if the cable 11 has segments with different diameters disposed in sequence, for example a conductor segment and a joint.

Preferably, the rotation speeds of the two pairs of traction wheels 15 will be suitably synchronized and coordinated so as to provide the same drawing speed to the cable 11.

The actuators 21 of the idle wheels 16 can be hydraulic cylinders able to dampen impacts with the additional function of being able to maintain the pressure generated on the cable 11 constant, whatever the diameter or thickness of the cable 11.

The frame 14 of the traction module 12 can be connected to the recovery machine 10, in particular to the support structure 13, by a hinge 30. The hinge 30 allows to vary the inclination of the traction module 12, with the aid of suitable drive means, such as for example at least a lifting or lowering actuator 31 or suchlike.

Figure 3:
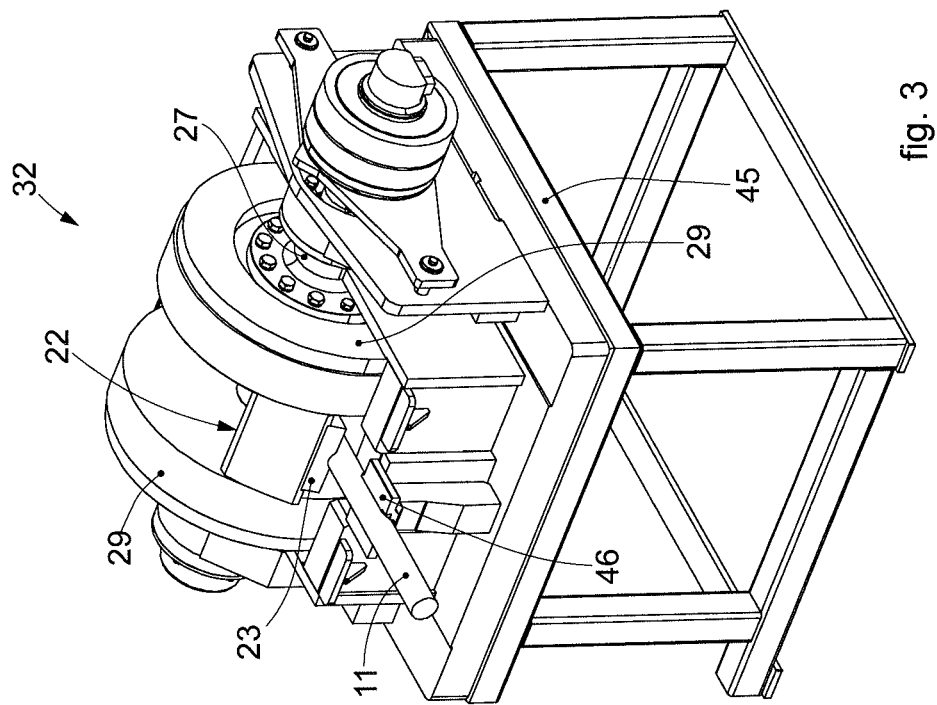
FIG. 3 is a second three-dimensional view of the cutting unit in a lowered cutting position.
Figure 2:
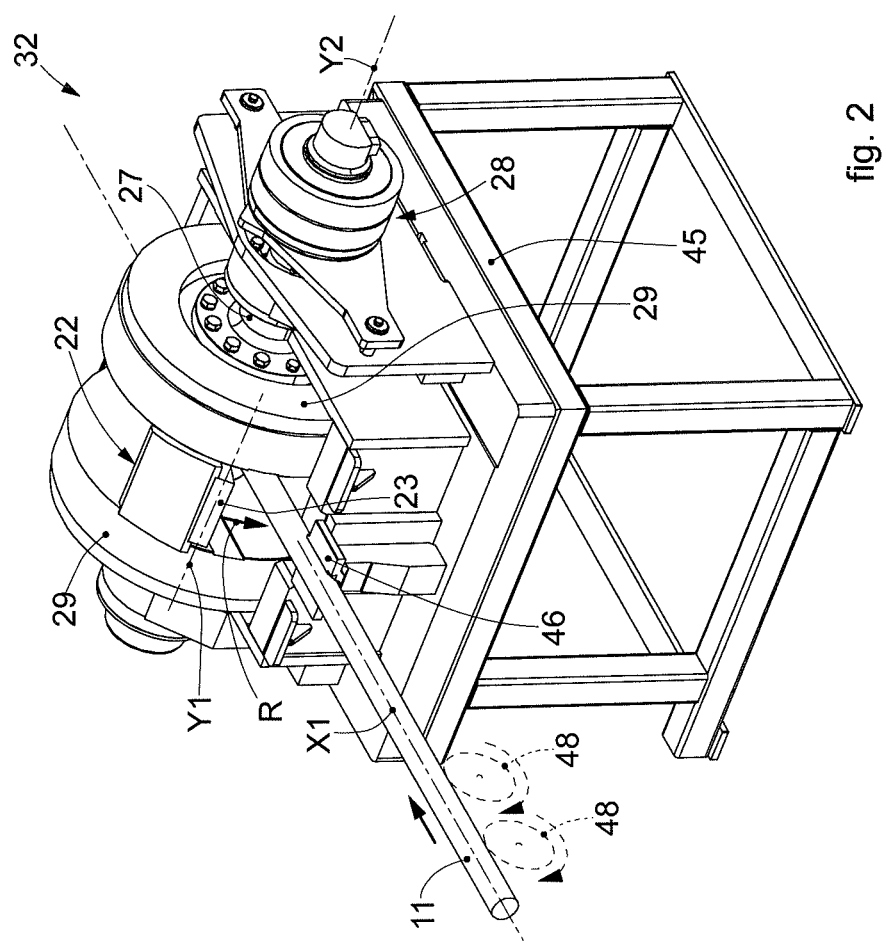
FIG. 2 is a first three-dimensional view of a cable cutting module provided with a cutting unit in a raised position.
Figure 4:
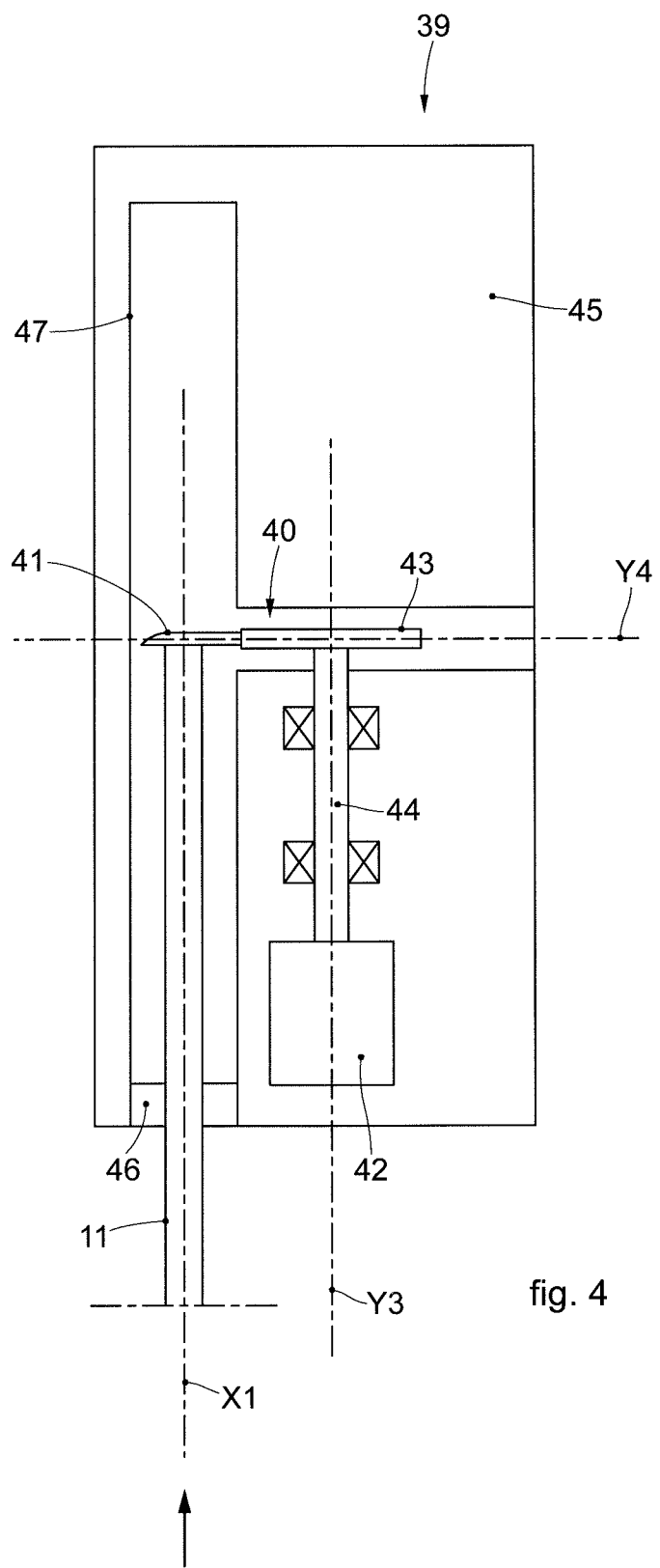
FIG. 4 is a schematic plan view of a variant of the cutting module of the present machine.

Downstream of the traction module 12 the machine 10 comprises a cutting module 32, 39 see also FIG. 2, FIG. 3, FIG. 4, which is used to divide the cable 11 into segments of a given length, for the purpose of storage and subsequent disposal.

The purpose of the cutting module 32, 39 is therefore to continuously cut the cable 11 exiting the traction module 12 and which is introduced into the cutting module 32, 39 in a direction of feed X1.

The cutting module 32, 39, comprises a cutting unit 22, 40 provided with at least a cutting blade 23, 41. The cutting blade 23, 41 can be made preferably of a metal material, such as aluminum, steel or suchlike.

The cutting unit 22, 40 is integral with a shaft 27, 44 made to rotate, for example in the direction R, by corresponding drive means 28, 42, such as a hydraulic, electric or other motor.

By means of the rotation of the shaft 27, 44 the cutting unit 22, 40 is made to rotate and cuts the cable 11 when it enters the cutting module 32, 39 in the direction of feed X1.

The cutting unit 22, 40 is substantially directed along an axis Y1, Y4 substantially transverse to the direction of feed X1 of the cable 11 inside the cutting module 32. The cutting blade 23, 41, in particular, is directed along the axis Y1, Y4.

The cable 11 entering the cutting module 32, 39 can rest, for example, on a guide 46.

In a geometric configuration shown in FIG. 2, the axis Y1 of the cutting unit 22, that is in particular the axis along which the cutting blade 23 is directed, is substantially parallel to the axis of rotation Y2 of the shaft 27, therefore the shaft 27 is also directed in a direction substantially transverse to the direction of feed X1 of the cable 11.

The cutting module 32 comprises at least a pair of support disks 29 integral with the shaft 27 and between which the cutting unit 22 is positioned in a peripheral position. The cable 11 to be cut, substantially, is fed between the support disks 29 in the direction of feed X1.

FIGS. 2 and 3 show only one cutting unit 22, but it could be provided that the cutting module 32 is provided with several cutting units 22, disposed on an annular path around the shaft 27, for example at regular intervals.

In the embodiment of the cutting module 39 of FIG. 4, the axis of rotation Y3 of the shaft 44 and therefore of the cutting unit 40 is directed parallel to the direction of feed X1 of the cable 11. The axis Y4 of the cutting unit 40, that is the axis along which in particular the cutting blade 41 is directed, is substantially orthogonal to the axis of rotation Y3 of the shaft 44.

The cutting unit 40 can comprise a support disk 43 integral with the shaft 44. One or more cutting blades 41 can be disposed around the support disk 43, positioned for example at regular intervals around the support disk 43. In FIG. 4, by way of example, only one cutting blade 41 is shown.

This configuration of the cutting module 39 can be used in the machine 10 for reasons of space, for a different design of the overall layout of the machine 10, or other.

The cutting module 32, 39 comprises a support structure 45 in which an aperture 47 is made, see the cutting module 39 of FIG. 4, from which the cut segments of cable can pass directly to discharge means, for example one or more conveyor belts. See for example in FIG. 1 the conveyor belt 38 located under the support structure 45 and upstream of another conveyor belt 35. The aperture 47 is therefore disposed below the cutting unit 22, 40 and above the conveyor belt 38.

The present machine 10 can comprise a device 33 to guide and draw the cable 11, able to translate the cable 11 inside the cutting module 32 in the direction of feed X1.

The machine 10 can also comprise a system 34 to align the cable 11 downstream of the traction module 12. The alignment system 34 can comprise for example a roller way, see for example the rollers 48 schematically shown in FIG. 2. At least one of these rollers 48 can be motorized to contribute to drawing the cable 11. The rollers 48 can have, for example, a flat or indented profile, to improve traction.

The machine 10 is also equipped with an auxiliary winch 36 cooperating with the traction module 12.

The auxiliary winch 36 is provided with a drum 37 able to be made to rotate by suitable drive means, for example an electric or hydraulic gearmotor, or suchlike, and around which a wire is wound. The auxiliary winch 36 will preferably have a maximum work load equivalent to the traction module 12. The diameter and the length of the wire loaded onto the auxiliary winch 36 will be aligned with the nominal performances of the machine 10.

The functions of the auxiliary winch 36 are the following: at the beginning of the reconductoring operations, it attaches the cable 11 onto the support of the line of the laying plant and puts it between the traction wheels 15 and the idle wheels 16 of the traction module 12; it is possible to connect the wire of the auxiliary winch 36 to the cable 11 by means of a flexible joint, for example a braid-type joint, or a self-tightening vice, and release the cable 11 by the desired length since the draw of the line will be maintained by the auxiliary winch 36. Without the auxiliary winch 36 it would not be possible to carry out operations in which the cable 11 is released, since the latter, being cut, would exit the space defined between the idle wheels 16 and the traction wheels 15, causing the line still present on the poles of the laying plant to fall.

As mentioned above, the machine in question can be transported by truck and can work both on trucks and also on the ground. In both cases the correct positioning on the ground and anchoring of the machine 10 or of the truck on which the machine 10 is positioned is required. This anchoring occurs through the use of straps, stabilizers and plates.

Once positioning and anchoring are completed, the machine 10 can be adjusted in height so that, once the cable 11 has been cut by the cutting module 32, 39, the cable segments can be discharged into a suitable container by the discharge means 35, 38 or by gravity.

Since the cable 11 on the support of the laying plant and the machine 10 will be at different heights, the next step is to adjust the inclination of the traction module 12, which must be aligned with the angle created between the cable on the line and the entry side 17 of the traction module 12, to prevent the cable 11 from being misaligned and the connection joints of cable segments from flexing upon entry into the traction module 12. This operation is performed by driving the dedicated actuator 31 which rotates the traction module 12 around the hinge 30.

The next step is to make the cable 11 enter the traction module 12, in particular between the traction wheels 15 and the idle wheels 16. To do this, the machine 10 initially uses the auxiliary winch 36. It is possible, as seen, to connect the wire of the auxiliary winch 36 to the cable 11 on the support of the laying plant and start to draw the cable 11 from the support inside the traction module 12.

The cable 11 can be attached to the wire of the drum 37 of the auxiliary winch 36 by, for example, using self-tightening vices or other draw recovery systems.

The vice should preferably be placed at a distance from the beginning of the cable 11 suitable to create a length of "dead" cable that can then be inserted into the traction module 12.

Once the front end of the cable 11 arrives between the traction wheels 15 and the idle wheels 16, these are closed thus retaining the load (weight) of the line, thanks to the actuators 21.

The wire of the auxiliary winch 36 can then be disconnected from the cable 11 and recovered on the drum 37.

The operations of recovering the cable 11 and subsequent cutting of the cable into segments can now begin.

The load acting on the cable 11, that is the draw on the line, is generated and maintained by the pressure generated by the crushing of the cable 11 between the traction wheels 15 and the idle wheels 16, which are pressed onto the conductor generating the necessary friction force, thanks to the rotation of their supports 20 around the rotation pins 24 and the actuators 21.

The recovery speed of the cable 11, on the other hand, is given by the speed of rotation of the traction wheels 15 located in the lower part 25 of the traction module 12. The traction wheels 15 are synchronized by pinions and transmission wheels, and all rotate at the same speed. Each pair of traction wheels 15 is equipped with its own gearmotor. The recovery speed is variable according to the load applied.

Once the cable 11 has passed the traction module 12 it enters the cutting module 32, 39 in which it is cut into segments of cable by the cutting unit 22, 40. It is clear that it is possible to adjust the rotation speed of the rotation shaft 27, 44 of the cutting unit 22, 40 so as to adjust the interval of time that elapses between two successive passes of the cutting unit 22, 40 on the cable 11, which is translating in the direction of feed X1. As stated, it is also possible to provide more than one cutting unit 22, 40 on the cutting module 32, 39.

The segments of cable 11, once cut, are discharged into a suitable container by gravity or by using the conveyor belt 35, cooperating for example with the conveyor belt 38.

The work cycle of the machine 10 continues until all the old conductor on the line is recovered and cut.

If during the work cycle there is a need to release a few meters of cable 11, the process is as follows: stop the rotation of the traction wheels 15 maintaining the pressure on the cable 11; drive the auxiliary winch 36; connect the wire present on the drum 37 with the branch of the cable 11 upstream of the machine 10 by means of a suitable vice or other draw recovery system; start drawing the drum 37 to take up the tension of the line; move the idle wheels 16 away from the traction wheels 15 of the traction module 12; release the cable 11 by means of the drum 37 and the wire to which it is now connected.

To restart the recovery and cutting activities, it is necessary to proceed as described in the first step of the cycle.

The machine 10 can have on board a power unit which consists of an endothermic diesel engine which will supply the number of revolutions and the torque necessary to drive the various actuators present on the system, that is, pumps, hydraulic motors, hydraulic cylinders, shears and other.

It is clear that modifications and/or additions of parts may be made to the cable recovery machine as described heretofore, without departing from the field and scope of the present invention.

It is also clear that, although the present invention has been described with reference to some specific examples, a person of skill in the art shall certainly be able to achieve many other equivalent forms of cable recovery machine, having the characteristics as set forth in the claims and hence all coming within the field of protection defined thereby.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

In the following claims, the sole purpose of the references in brackets is to facilitate reading: they must not be considered as restrictive factors with regard to the field of protection claimed in the specific claims.

What is claimed is:

1. A cable recovery machine, comprising:
    at least one traction module configured to hold and draw at least one cable of a cable laying plant, and
    at least one cutting module located downstream of the traction module and able to receive said cable that is introduced into said at least one cutting module in a direction of feed (X1),
    wherein the traction module comprises a frame on which one or more traction wheels and one or more idle wheels are positioned, between said traction wheels and said idle wheels a space being defined for the passage and traction of the cable to be recovered,
    wherein said at least one cutting module comprises at least one cutting unit positioned substantially along an axis (Y1, Y4) transverse to said direction of feed (X1) of the cable inside the at least one cutting module and provided with at least one cutting blade integrally affixed to a rotating shaft, said shaft being made to rotate by corresponding drive means, so that by rotating said shaft, said at least one cutting unit is made to rotate and the cutting blade cuts the cable into segments of a given length when the cable enters the at least one cutting module in said direction of feed of the cable (X1),
    and wherein said at least one cutting module comprises one or more support disks of the at least one cutting blade, integral with said rotation shaft of the cutting unit, and
    wherein the cable recovery machine further comprises discharge means located downstream of said cutting module and able to allow to discharge the segments of cable cut by the machine.

2. The machine as in claim 1, wherein said axis (Y1), along which said at least one cutting unit is positioned, is directed substantially parallel to an axis of rotation (Y2) of said shaft integral with the cutting unit.

3. The machine as in claim 1, wherein said axis (Y4) along which said at least one cutting unit is positioned, is directed substantially transverse to an axis of rotation (Y3) of said shaft integral with the cutting unit.

4. The machine as in claim 1, wherein it comprises discharge means located downstream of said at least one cutting module and able to allow to discharge the segments of cable cut by the machine.

5. The machine as in claim 4, wherein said at least one cutting module comprises a support structure provided with at least one aperture able to allow the direct passage of the cut segments of cable toward said discharge means.

6. The machine as in claim 5, wherein said discharge means comprise at least a first conveyor belt located under said aperture and at least a second conveyor belt located downstream of said first conveyor belt.

7. The machine as in claim 1, wherein it comprises a system to align the cable, located downstream of said traction module.

8. The machine as in claim 7, wherein said alignment system comprises a plurality of rollers disposed in sequence and on which the cable is made to pass in said direction of feed (X1).

9. Cable laying plant comprising at least a cable recovery machine provided with:
    At least one traction module configured to hold and draw at least one cable of the cable laying plant, and
    at least one cutting module located downstream of the traction module and able to receive said cable that is introduced into said at least one cutting module in a direction of feed (X1),
    wherein the traction module comprises a frame on which one or more traction wheels and one or more idle wheels are positioned, between said traction wheels and said idle wheels a space being defined for the passage and traction of the cable to be recovered,
    wherein said at least one cutting module comprises at least one cutting unit positioned substantially along an axis (Y1, Y4) transverse to said direction of feed (X1) of the cable inside the at least one cutting module and provided with at least one rotating cutting blade and integral with a shaft made to rotate by corresponding drive means, so that by rotating said shaft, said at least one cutting unit is made to rotate and the cutting blade cuts the cable into segments of a given length when the cable enters the at least one cutting module located downstream of said traction module in said direction of feed (X1) of the cable,
    wherein said at least one cutting module comprises one or more support disks of the at least one cutting blade, integral with said rotation shaft of the at least one cutting unit, and
    wherein the cable recovery machine further comprises discharge means located downstream of said cutting module and able to allow to discharge the segments of cable cut by the machine.

\* \* \* \* \*